Feb. 14, 1933.  G. VAN BEUSEKOM  1,897,450
APPARATUS FOR TESTING DISCHARGE TUBES
Filed Oct. 5, 1929
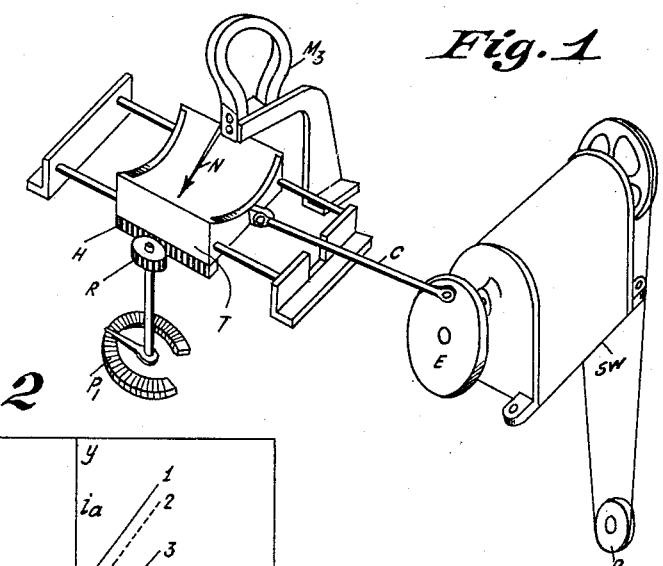
*Fig. 1*
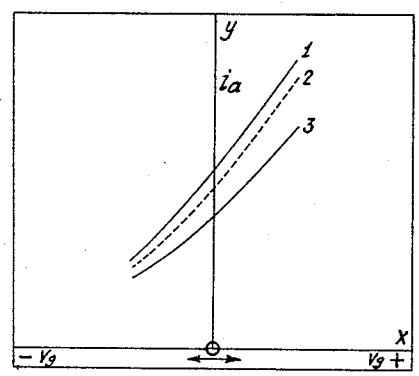
*Fig. 2*
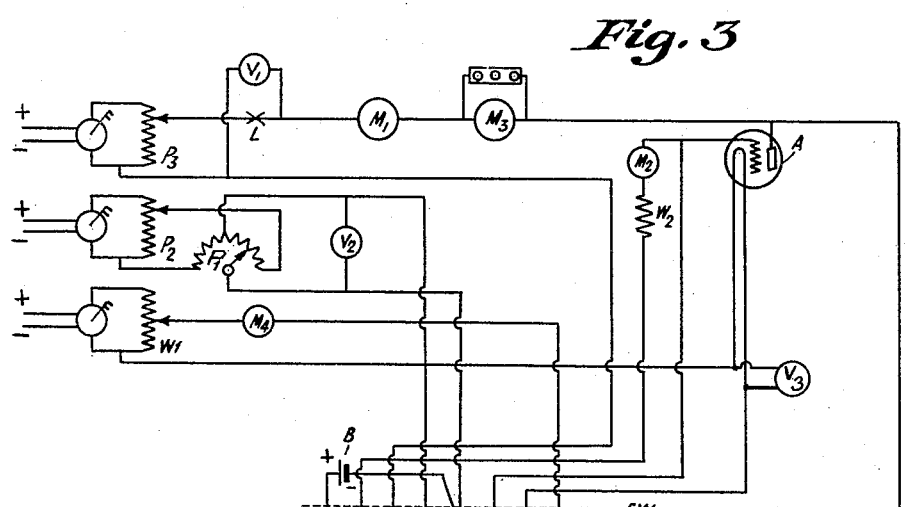
*Fig. 3*
INVENTOR
GODEFRIDUS VAN BEUSEKOM
BY
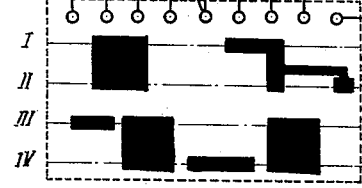
his ATTORNEY Patented Feb. 14, 1933

1,897,450

UNITED STATES PATENT OFFICE

GODEFRIDUS VAN BEUSEKOM, OF EINDHOVEN, NETHERLANDS, ASSIGNOR TO RADIO CORPORATION OF AMERICA, A CORPORATION OF DELAWARE

APPARATUS FOR TESTING DISCHARGE TUBES

Application filed October 5, 1929, Serial No. 397,725, and in the Netherlands October 13, 1928.

It is desirable that articles which are manufactured on a large scale, for example, radio valves, should be subjected after manufacture to a test of their characteristics and other qualities (for example vacuum, insulation between electrodes, etc.). Naturally, this test should be effected rapidly as otherwise it would become too expensive. The invention has for its object to provide apparatus by means of which the said test can be rapidly effected by an unskilled laborer.

According to the invention the apparatus is so arranged that the characteristic of the tube under control is indicated by a pointer adapted to move laterally over a slide which is moved longitudinally, the other above mentioned qualities of the tube being determined during the return stroke of the said slide.

The apparatus according to the invention may comprise a switch drum which is driven in synchronism with the slide so as to make one revolution to each full period of the slide movement, the drum contacts being so arranged that during the forward stroke of the slide the connections necessary for registering the characteristic are made, and that during the return stroke those connections are successively established which are required for determining the above mentioned qualities of the tubes.

Further characteristics of the invention will be clearly understood by reference to the accompanying drawing, in which an embodiment of the invention is illustrated.

Figure 1 shows the device diagrammatically.

Figure 2 represents the paper on which the device sets forth the characteristics of the tube being tested.

Figure 3 is a diagrammatic showing of the electrical connections of the device.

Figure 1 shows diagrammatically the various members of the apparatus. The drive is effected preferably by means of a direct current motor (not shown) in order to permit adjustment of the number of revolutions. The motor is coupled to a worm case (likewise not shown) of a high ratio of gearing, the pulley P of which drives the spindle of a switch drum S W at a speed of 500 to 600 revolutions per hour, according to the working speed desired. A slide T which slides on two rods is reciprocated by an eccentric E and a connecting rod C and has a toothed-rack H which by means of a pinion wheel R reciprocates the arm of a potentiometer $P_1$ so that a gradually varying (positive and negative) grid bias is supplied to the tubes under test.

In addition a stationary milliammeter $M_3$ is provided with a pointer N having its carrying point in the axis of the cylindrically bent upper surface of the slide. The pointer N is adapted to rotate in a surface at right angles to the movement of the slide.

The hollow cylindrical surface of the slide T bears a sheet of paper which is illustrated separately in Figure 2.

On this sheet of paper are shown two lamp characteristics (1 and 3) of the type of lamp to be controlled. It is assumed that a good lamp should have a characteristic somewhere between these two characteristics, such for example as line 2.

Assume an X-axis and a Y-axis to be on the paper. The slide shown in Figure 1 moves according to the X-axis, whereas the pointer N of the milliameter $M_3$ moves in a direction perpendicular to the X-axis. Now, if the slide is moved and the deflection of the pointer N varies at the same time and if the points indicated by the pointer on the paper are considered, the displacement of the slide and the deflection of the pointer of the milliammeter will be equal respectively to the abscissas and the ordinates of the points of the lamp characteristic relative to the axes X and Y.

If care is taken that the displacement of the slide is at all times a measure of the grid bias supplied to the tube and that the milliammeter, by means of the pointer N, indicates the plate current, the pointer will at all times indicate on the paper a point of the grid voltage plate current characteristic of the tube under test. If therefore all the points indicated by the pointer are situated between the lines 1 and 3, the tube is a good one.

This is provided for when the milliammeter $M_3$ is connected in the plate circuit of the tube under test and when, as in the construction shown in Figure 1, the arm of the potentiometer rotates in a manner proportional to the displacement of the slide so that virtually the pointer N indicates points of the characteristic.

Figure 3 shows the diagram of connections.

Before the characteristic of a tube is measured the apparatus indicates in the circuit arrangement whether the tube has insulation defects between the electrodes and also whether the vacuum is good. The connections therefor are changed over by means of the switch drum S W (see also Figure 1) which is moved uniformly.

Position I of the switch drum determines the insulation between the plate and the other electrodes.

Position II determines the insulation between the grid and the other electrodes.

Position III is the position for measuring the vacuum.

Position IV is the position for measuring the grid voltage plate current characteristic.

A micro-ammeter $M_2$ serves for measuring the leakage and the vacuum. A resistance $W_2$ serves to protect this meter. The deflection of $M_2$ must not exceed a given amount if the tube is to be approved.

The leakage and vacuum are measured when the slide T (Figure 1) moves from the left to the right. The return stroke is used for the greater part for measuring the characteristic. A little before the end of the stroke this operation is finished and there is just sufficient time left to replace the tube with another one before the new operation of measuring the insulation is started.

The plate voltage which also serves for measuring the leakage and the vacuum is read on a voltmeter $V_1$ and is adjusted by means of a potentiometer $P_3$.

The regularly varying grid bias is obtained from a potentiometer $P_1$. A fixed central top thereof is connected to the filament contact of the tube socket and thus the tube obtains successively negative and positive grid bias. On a meter $V_2$ having the zero point in the centre of the scale the progress of the said grid bias tension can be seen.

A resistance $W_1$ permits adjustment of the filament supply voltage of the tube which can be read on a meter $V_3$. The meter $M_3$ (see also Figure 1) is the meter which as set forth above, indicates the abscissas of the characteristics. In addition $M_3$ has connected to it in series an ordinary meter $M_1$ for control.

A battery B of two volts serves for measuring the vacuum. L is a resistance lamp for protecting the meters $M_1$ and $M_3$.

In measuring tubes having an indirectly heated cathode a great difficulty arises in that about 35 seconds are necessary to heat the cathodes. The apparatus above described can therefore not be used for tubes of this type without auxiliary means being resorted to. In order to allow a continuous operation also for these lamps the apparatus according to the invention has to be altered as follows.

Instead of one tube socket the apparatus should comprise a plurality, say six, all the filament supply contacts of which are permanently under tension.

A distributor drum ensures that at all times one of the tubes is successively connected to the switch drum for being measured. Meanwhile the cathodes of the other lamps are also heated. This distributor drum should preferably be run at a speed as many times lower than that of the above mentioned switch drum as there are tube sockets.

A pointer may be provided to indicate which tube is measured at a given moment. When the measuring operation is finished the particular tube is removed and replaced with a new one. Meanwhile the distributor drum moves the next tube into measuring position, and after being measured this tube is replaced with another one in the same manner.

If the speed of the apparatus is adjusted at 500 tubes per hour, each tube requires $$\frac{3600}{500} = 7.2 \text{ sec.}$$

When combining six tubes there is $5 \times 7.2 = 36$ sec. available for heating the cathode, which is just sufficient.

I claim:

1. A discharge tube tester comprising a movable slide, driving means for moving said slide, an ammeter having a pivoted pointer and mounted to cause the free end of said pointer to move over said slide, electrical connections for the electrodes of a tube to be tested, and switching means controlled by said driving means to vary said connections to establish a voltage difference between said electrodes during movement of said slide in one direction and to cause current to flow through said ammeter and between electrodes of the tube to be tested during the return movement of said slide.

2. A discharge tube tester comprising a movable slide, driving means for said slide, an ammeter having a pivoted pointer and mounted to cause the free end of said pointer to move over said slide, a potentiometer actuated by said driving means in synchronism with said slide, electrical connections for the cathode, grid and plate of a tube to be tested, and switching means controlled by said driving means to vary said connections to establish during movement of said slide in one direction a difference in voltage between said plate and the other electrodes and then between said grid and the other electrodes, and during the return movement to supply current to heat said cathode, connect said plate and cathode in series with said ammeter, and during the return movement of said slide to apply varying voltage to said grid thru said potentiometer.

3. A discharge tube tester comprising a reciprocating slide, driving means for reciprocating said slide, a potentiometer actuated in synchronism with said slide, a pivoted arm mounted to cause its free end to swing over said slide, current responsive means for actuating aid pointer, electrical connections for connecting said current responsive means to the cathode and plate and said potentiometer to the grid of a tube to be tested, and switching means actuated by said driving means in synchronism with said slide to vary said connections in succession to establish a difference in voltage between one of the electrodes and the other electrodes during movement of said slide in one direction and to heat the cathode and establish during the return movement of said slide a voltage difference between the heated cathode and plate and simultaneously apply thru said potentiometer a varying voltage to the grid of the tube to be tested.

4. In a discharge tube tester the combination of a carrier movable to and fro, a pivoted arm mounted to cause its free end to move over said carrier transversely of the direction of movement of said carrier, an electric meter for actuating said arm, a potentiometer, and driving means for moving said carrier and actuating said potentiometer in synchronism, of electrical connections for applying voltage thru said meter and thru said potentiometer to the electrodes of a tube to be tested, and switching means actuated by said driving means for varying said connections during movement of said carrier.

5. In a discharge tube tester the combination of a reciprocating carrier, a pivoted arm mounted to cause its free end to move over said carrier transversely of the direction of movement of said carrier, an electric meter for actuating said arm, a potentiometer, and driving means for reciprocating said carrier and actuating said potentiometer, of electrical connections to the electrodes of a tube to be tested, and switching means actuated by said driving means for varying during movement of said carrier in one direction said electrical connections to establish a voltage difference between the electrodes of the tube and during movement of said carrier in the other direction to supply heating current to the cathode and pass thru said meter current between the cathode and plate and simultaneously apply thru said potentiometer a varying voltage to the grid of the tube.

6. A discharge tube tester comprising a reciprocating carrier for a record sheet, an ammeter having a pivoted member mounted to cause its free end to swing over a sheet on said carrier transversely of the direction of movement of said carrier, a potentiometer, driving means for reciprocating said carrier and actuating said potentiometer in synchronism, electrical connections thru said potentiometer to one electrode and thru said ammeter to another electrode of a tube to be tested, and switching means actuated by said driving means to vary said electrical connections to cause a current which varies in response to said varying voltage applied by said potentiometer to flow between electrodes of the tube and thru said ammeter.

GODEFRIDUS van BEUSEKOM.